United States Patent [19]

Kang et al.

[11] Patent Number: 4,921,082
[45] Date of Patent: May 1, 1990

[54] FLUID CONTROL CYLINDER ASSEMBLY FOR AUTOMOBILE BRAKE SYSTEM

[76] Inventors: Byung K. Kang, 211-88 Sangdo 4-dong, Dongjak-ku, Seoul; Jin C. So, 525-24 Shinsa-dong, Kangnam-ku, Seoul, both of Rep. of Korea

[21] Appl. No.: 126,731

[22] Filed: Nov. 30, 1987

[30] Foreign Application Priority Data

Jul. 24, 1987 [KR] Rep. of Korea .................... 8079/87

[51] Int. Cl.⁵ ............................................ B60K 41/24
[52] U.S. Cl. .................................. 192/13 A; 137/598
[58] Field of Search ..................... 192/13 A; 137/598; 303/89; 188/353

[56] References Cited

U.S. PATENT DOCUMENTS

| | | | |
|---|---|---|---|
| 2,190,981 | 2/1940 | Freeman | 188/353 |
| 2,251,787 | 8/1941 | Gardiner | 192/13 A X |
| 4,247,154 | 1/1981 | Shoji et al. | 192/13 A X |
| 4,520,911 | 6/1985 | Gaiser | 192/13 A |
| 4,540,072 | 9/1985 | Suzuki et al. | 192/13 A X |
| 4,553,651 | 11/1985 | Gaiser | 192/13 A |
| 4,610,338 | 9/1986 | Kubota et al. | 192/13 A |
| 4,658,942 | 4/1987 | Kubota et al. | 192/13 A |

Primary Examiner—Rodney H. Bonck
Assistant Examiner—Richard M. Lorence
Attorney, Agent, or Firm—Fleit, Jacobson, Cohn, Price Holman & Stern

[57] ABSTRACT

A brake fluid control cylinder assembly for use in a brake system of an automobile comprises a cylindrical housing, two coaxially-spaced chambers therein and an internal flange wall therebetween, a coaxial opening in the flange wall, front and rear pistons slidable in the respective chambers, each having respective piston rods extending therefrom, brake fluid inlets and outlets for each chamber, check valves in the outlets to allow flow of pressurized brake fluid to the wheel cylinders, a bracket for mounting the housing on the vehicle body, a lever arm pivotally mounted on the bracket and engageable by a member extending from the clutch pedal, a push rod on the lever arm engageable with the rear piston so that operation of the clutch pedal moves both pistons in the direction to pressurize brake fluid in the chambers and cause flow through the check valves to actuate the brakes, and a sliding pin spring-urged into the rear of the rear cylinder chamber to engage the rear end of the rear piston upon return thereof when the clutch pedal is operated, so that the clutch pedal functions as an auxiliary brake to maintain the brakes in the actuated position when the automobile is stopped on an incline and the brake pedal is released. During normal use, the brake system acts in a conventional manner, the brake fluid passing through the inlets, cylinder chambers, and outlets of the control cylinder.

10 Claims, 8 Drawing Sheets

FLUID CONTROL CYLINDER ASSEMBLY FOR AUTOMOBILE BRAKE SYSTEM

BACKGROUND OF THE INVENTION

1. Field Of The Invention

This invention relates to a brake system in an automobile and particularly to a fluid control cylinder assembly between a master cylinder and wheel cylinders and operated by a clutch pedal for auxiliary brake application.

2. Description Of The Prior Art

In a conventional brake system in an automobile when a driver depresses a brake pedal to stop his car the fluid from a master cylinder exerts force on the wheel cylinders applying friction to each wheel brake disk, or drum, thus stopping the car.

Immediately before stopping the car the clutch pedal is depressed to disengage the clutch disk from the flywheel gear. Thus, even after the car is stopped the R.P.M. of the engines is maintained.

When starting the car the driver shifts his foot from the brake pedal to an accelerator pedal, the moment the clutch pedal is depressed to engage the gears. Thereafter, the depression of the accelerator pedal is increased to increase the R.P.M. of the engines and the clutch pedal is gradually released to engage the clutch to transmit the power of the engine to the wheels, thus starting the car.

In the above mentioned brake system on flat land the moment the foot is shifted from the brake pedal to the accelerator pedal the car remains stationary. However, on hills, at the aforementioned moment the car begins to roll.

To shorten the rolling distance the driver tries to operate the pedal quickly. To a skilled driver the operation is not difficult. However, to an unskilled driver the operation is difficult and thus tends to cause a dangerous accident such as a car crash.

BRIEF SUMMARY OF THE INVENTION

An object of this invention is to provide a brake system which overcomes the above mentioned disadvantages.

A further object of the invention is to provide a hill-holder in the brake system of an automobile operated by the clutch pedal.

Another object of this invention is to provide a brake system which stops an automobile safely and properly even in the event of bursting of one of the brake lines in the automobile.

The above objectives are accomplished by this invention which provides a fluid control cylinder assembly comprising a fluid control cylinder, a bracket member and an operating lever. The control cylinder assembly is positioned between the master cylinder and wheel cylinders and below the clutch pedal, which members are connected one with another. The control cylinder is divided into two chambers and has holes or inlets and outlets around the peripheries thereof. Check valve balls are provided for closing and opening of the outlets.

The control cylinder assembly is secured onto the front wall of the automobile.

To stop the car by depressing the brake pedal with the depression of the clutch pedal being increased, the oil from the master cylinder moves through the control cylinder to the brake lines, in which control cylinder the fluid is pressurized by the pistons. In this condition even after the driver's foot is released from the brake pedal the pressurized fluid in the control cylinder is transmitted to the brake lines thus maintaining the stopped position of the car.

However, during driving with only the clutch pedal being depressed the fluid in the control cylinder has no effect upon the brakes since the amount of the fluid in the control cylinder is too small to have such effect.

BRIEF DESCRIPTION OF THE DRAWINGS

A better understanding of the present invention will be possible from the following detailed description with reference to the accompanying drawings, showing merely an illustrative embodiment, wherein.

DETAILED DESCRIPTION OF THE INVENTION

Figure 1:
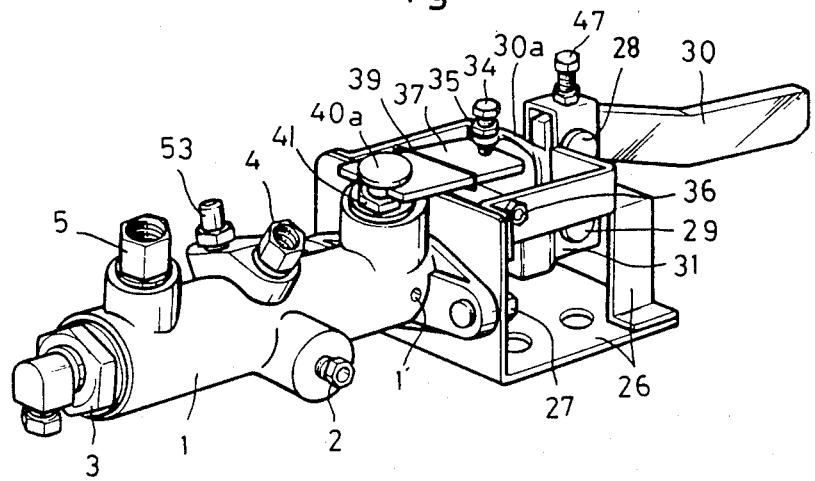
FIG. 1 is a perspective view of a control cylinder assembly o present invention.

Referring now to the drawings and particularly to FIG. 1 there is provided an oil control cylinder assembly comprising an oil control cylinder 1, a bracket member 26 and a lever member 30.

Figure 4:
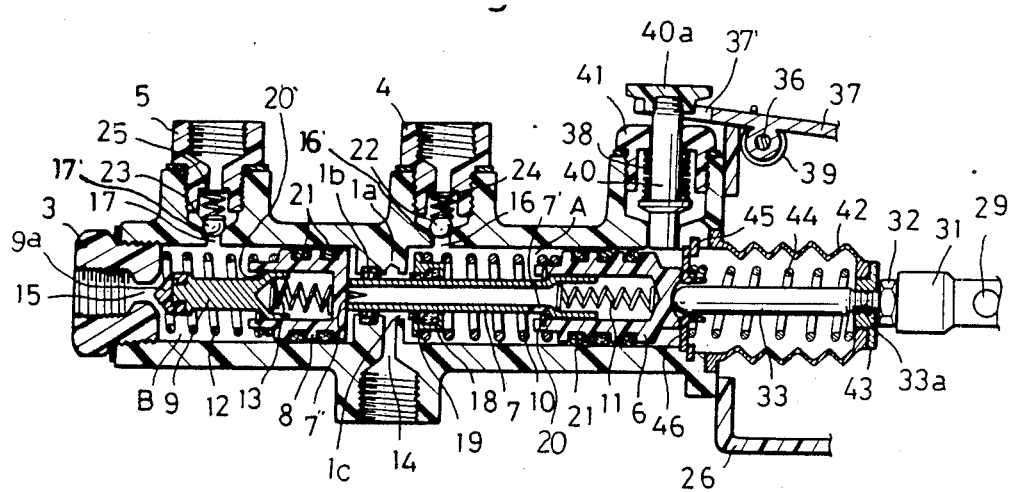
FIG. 4 is a longitudinal cross-sectional view of the control cylinder assembly during driving with no clutch or brake pedal depressed.

The oil control cylinder 1 as shown in FIG. 4 has two rear and front chambers A, B, respectively, therein which are divided by a central wall 1a. The central wall 1a has a central through hole 1c.

The control cylinder 1 has outwardly protruding portions through which through holes 14, 15, 16 and 17 are provided, which are used as fluid inlets and outlets.

The inlets 14, 15 are for receiving fluid from a master cylinder C therethrouqh. Through the outlets 16, 17 fluid flows out into brake lines. Into the protruding portions having inlets and outlets 14, 15, 16 and 17 nipples 2, 3, 4 and 5 are threaded.

The inlet 15 is concentric with the central through hole 1c.

In the rear chamber A a rear piston 6 and a piston rod 7 are provided connected to each other. The rear cup-shaped piston has a piston rod spring 11 therein. The piston rod 7 is circumferentially widened at one end which is inserted into the piston and held in position by a snap ring 20 and resiliently urged outwardly by the spring 11.

A piston spring 10 has its free length located circumferentially around the outer portion of the piston rod 7 and is mounted on a spring seat 18 at one end.

Around the piston rod 7 a rubber packing 19 is inserted being fittingly abutted in the spring seat 18. The packing 19 is for sealing engagement with the central hole 1c.

The check valve ball 22 is provided under the nipple 4 and urged by a spring 24 for sealing engagement with the fluid inlet 16.

The front chamber B has a piston 8 therein which is connected to a push rod 9. The circumferentially widened rear end of push rod 9 is inserted into piston 8 and held in place by a snap ring 20'.

The front cup-shaped piston 8 has a push rod spring 13 therein to urge the push rod 9 outwardly. A valve seal 9a is supported and engages sealingly on the other end of the push rod 9.

The valve seal 9a is for sealing engagement with the inlet 15.

The front end of the push rod 7 passes through the central hole 1c of the wall 1a and is held in abutting position against the bottom of the front piston 8.

A sealing packing 1b is provided opposingly to the sealing packing 19 for sealing engagement with the central hole 1c. The sealing packing 1b serves to allow shifting of the push rod 7 but prevents passing of fluid.

A coil spring 12 under compression is located between the nipple and the piston 8 for maintaining proper abutment of the bottom of the piston 8 against the front end of the push rod 7.

A plurality of compression O-rings 21 are located around the outer peripheries of the pistons 6, 8 for fitting snugly to the inner walls of the chambers A, B.

Check valve ball 23 is provided for closing the outlet 17 concentric with the nipple 5.

Figure 14:
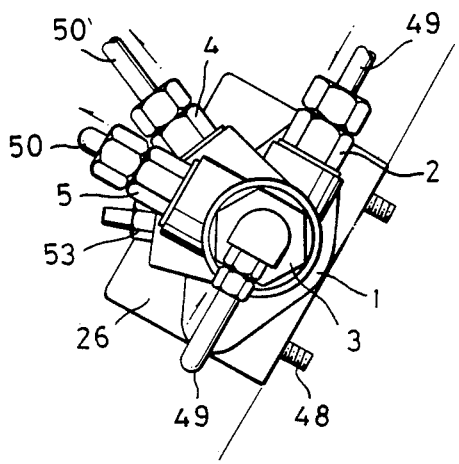
FIG. 14 is an end view of the control cylinder assembly of the present invention showing its connection on the front wall within an automobile.
Figure 15:
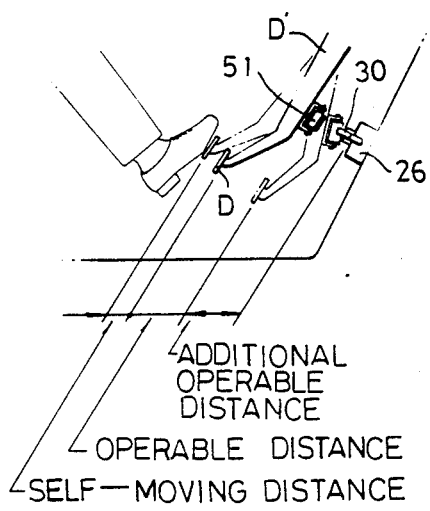
FIG. 15 is a schematic side view of a clutch pedal showing the movable distance thereof.

A bracket member 26 with an L-shaped piston operating lever 30 and a U-shaped support member 31 is bolted to the control cylinder by bolts 27. The L-shaped piston operating lever 30 has two upper and lower holes in its base section for receiving respective pins 28, 29. By the pin 28 the lever 30 is connected to the bracket member 26. Bracket member 26 is secured to the body of the vehicle on the wall adjacent the clutch pedal (see FIGS. 14 and 15) by bolts 48. Bolt 47 threadedly engages a hole in an upper part of bracket 26 and the end thereof engages against an upper surface on lever 30 so that bolt 47 controls the degree of rotation of the lever.

The U-shaped support member 31 has two flat prongs on which aligned holes are formed for engaging the pin 29. The pin 29 passes through the lower hole of the lever 30 and the two holes of the U-shaped support member 31.

To the U-shaped support member a nut 32 (FIG. 4) is welded and with the nut 32 a thread 33a of a rod 33 is engaged, thus moving with the U-shaped support member 31.

A space control bolt 34 engages the nut formed on the laterally protruding end portion 30a of the lever 30.

A lock nut 35 located between the bolt 34 and nut portion 30a serves to prevent the bolt 34 from inadvertently releasing from nut portion 30a and also serves to control the height of the bolt 34.

The bracket 26 has an upper rectangular member and a pin 36 is located between the opposing walls of the upper rectangular member as shown in FIG. 1.

A plate 37 is mounted on the pin 36 by a suitable length of a coil spring 39 which coil spring is wound around one end of the pin 36.

The plate 37 has one end located below the space control bolt 34, and the other end has semi-oval cut-out portion 37' (FIG. 4) positioned between a cap 40a of a piston rearward movement stop pin 40 and a cap bolt 41.

The control cylinder 1 has another through hole for receiving the piston rearward movement stop pin 40. The cap 40a is threaded onto the stop pin 40. Below the cap 40a is provided a cap bolt 41.

A coil spring 38 is located about the middle portion of the piston rearward movement stop pin 40 and between a shoulder on the stop pin and the bolt 41. By the force of the spring 38 during the forward movement of the rear piston 6 the stop pin 40 moves downwardly with the cap 40a and the operable plate 37. At this moment the force of the coil spring 39 facilitates the downward movement of plate 37.

A bellows tube 42 housing the rod 33 is threaded onto the thread 33a of the rod 33 by a nut 43 located at one end thereof. In use, the bellows tube 42 serves to prevent foreign matters such as dust from entering the control cylinder 1.

A coil spring 44 within the bellows tube 42 and around the outer periphery of the rod 33 facilitates expansion and contraction of the bellows tube 42.

A guide tube 46 is located inside control cylinder 1 for the proper forward and rearward movement of rod 33 and is held in place by a C-ring 45.

The piston rod 7 has a hole 7' for receiving fluid and a V-shaped cut-out portion 7" through which fluid is returned to the hole 7'.

Figure 16:
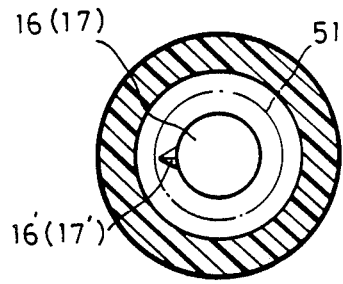
FIG. 16 a cross-sectional view of the holes which are formed in the side for fluid outlets of the control cylinder.

An exhaust plug 53 is provided adjacent the outlet through nipple 4 for exhausting air or fluid and an exhaust hole 1' is provided for exhausting moisture or the like. The outlets 16, 17 have continuous small return flow by-pass openings or gaps 16', 17' as shown in FIG. 16.

The further operation of this invention will now be described.

FIG. 4 shows the control cylinder assembly when the automobile is in its driving or stopping position. In this condition the fluid is filled within the control cylinder 1 and the brake lines. The piston 6 having the widened end of the piston rod 7 secured therein is in its utmost rearward position with the bottom being abutted to the guide cylinder 46 and the end of the rod 33. The cylinder spring 10 has the free length thereof. The circular hole 1c is in unsealed position since the sealing packing 19 is spaced apart from the central wall 1a so that the fluid received into the inlet 14 may be moved into the rear chamber A. The front piston 8 is spaced from the central wall 1a abutting the end of the piston rod 7. The valve 9a is also spaced from the inlet 15 since piston 8 is forcibly compressed rearwardly by the force of the cylinder spring 12.

The check valve balls 22, 23 close the outlets 16, 17 since no fluid pressure is exerted thereon and the pressure of the springs 24, 25 is exerted thereon. The stop pin 40 with the spring 38 around it is in the upward position.

Figure 5:
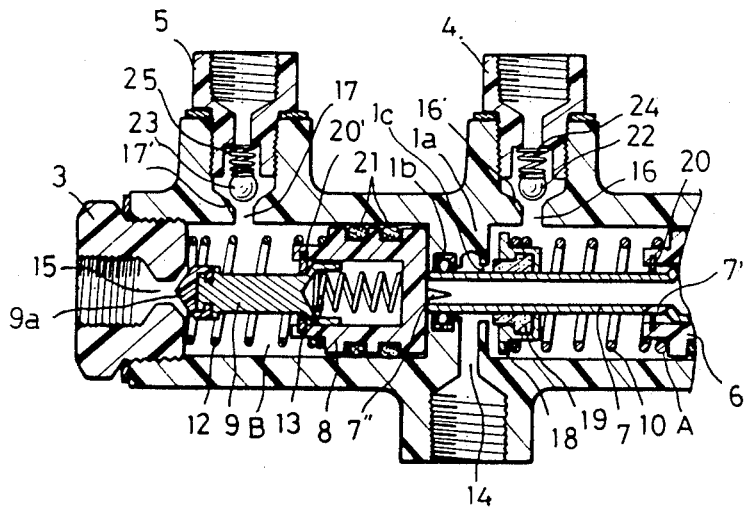
FIG. 5 is an enlarged fragmentary cross-sectional view of the control cylinder of the present invention during driving with the brake pedal depressed.

When the driver desires to stop his car by depressing the brake pedal fluid from the master cylinder C is forced to enter along flow lines 49 through the inlets 14, 15 into the chambers A, B, and pushes the check valve balls 22, 23 upwardly as shown in FIG. 5. Thereafter, the fluid is transmitted along brake lines 50, 50' to the wheel cylinder assembly f, f' of the front and rear wheels 50a, 50b, and thereafter compresses shoe assembly and drum or disk by friction thus stopping the car.

Figure 2:
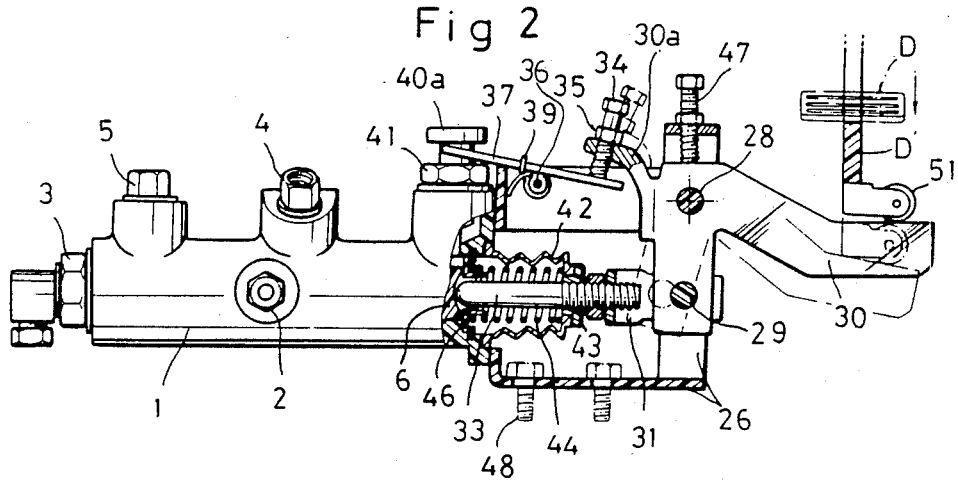
FIG. 2 is a side elevational view of the control cylinder assembly partially broken away and in cross-section showing connection of a piston operating lever to the control cylinder and location of the assembly below the clutch pedal.
Figure 3:
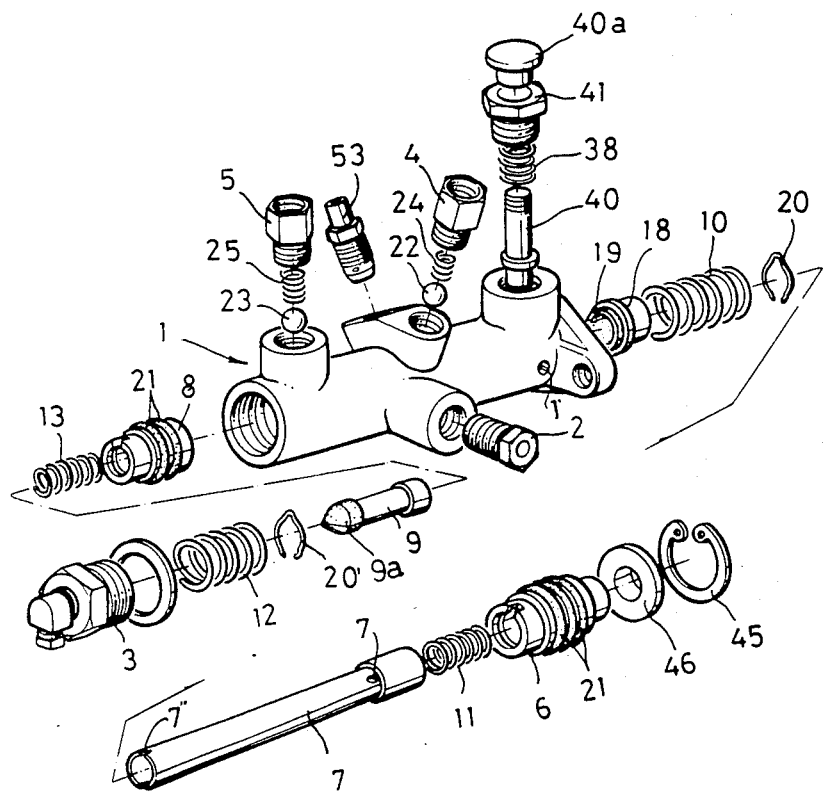
FIG. 3 is an exploded view of the control cylinder.

To disconnect the engine power the clutch pedal is depressed, thus moving the lever 30 downwardly as shown in FIG. 2. The U-shaped support member 31 with the rod 33 pushes the piston 6 within the rear chamber forwardly, and thus spring 38 under compression moves stop pin 40 downwardly with the cap 40a and the plate 37. To aid the operation of the clutch pedal D a slip roller 51 is provided under the bottom of the clutch pedal on clutch pedal lever D'. The slip roller 51 also produces no noise when the clutch pedal is depressed. As the piston 6 is pushed forwardly, the cylinder spring 10 is compressed and thus, the central fluid hole 1c is sealed with the sealing packing 19. Accordingly, the space of the rear chamber A is decreased. At this time the piston rod 7 by the force of the return spring 11 pushes the front piston 8 forwardly with the cylinder spring 12. Accordingly, the spring 13 and the push rod 9 move forwardly together until the valve seal 9a is sealingly engaged with the inlet 15. During this operation a small amount of the fluid which has remained in the chambers A, B pushes the check valve balls 22, 23 so that the small amount of fluid is transmitted along brake lines 50, 50' into the wheel cylinders f, f'. In this condition, the amount of the fluid is so small as not to effect the brake, but the pedal operates only the clutch. Thereafter, the check valve balls 22, 23 by restoring force of springs 24, 25 move downwardly to sealingly engage the outlets 16, 17 again.

Figure 6:
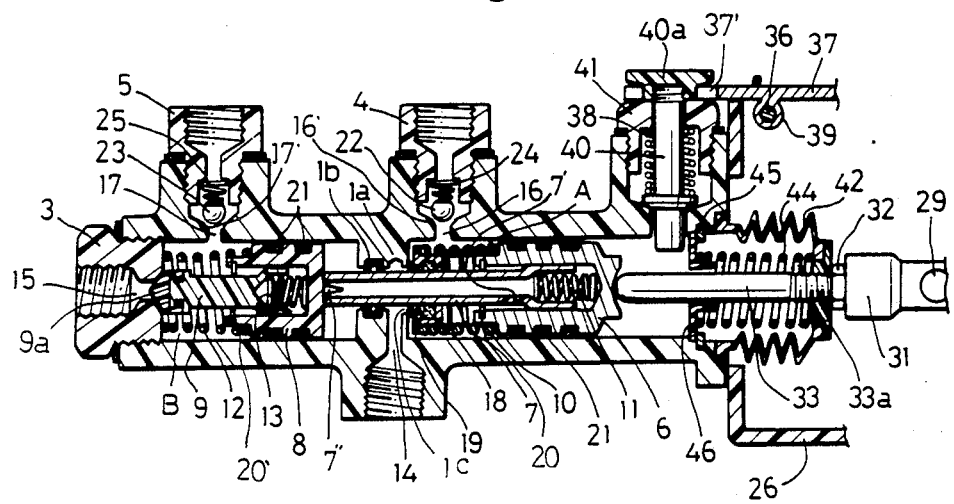
FIG. 6 is a cross-sectional view similar to FIG. 4 with the clutch pedal depressed.

It is important to differentiate between the size and elasticity of the rear cylinder spring 10, front cylinder spring 12, return spring 11 and space-maintaining spring 13 for operating properly the control cylinder assembly. That is, the relative force and elasticity of these components is in decreasing order, the return spring 11, the rear cylinder spring 10, the front cylinder spring 12 and the space maintaining spring 13. Thus, when the rear piston 6 is pushed forwardly, the most elastic return spring 11 holds the front piston 8 and the push rod 9 in their position as shown in FIG. 6.

Figure 7:
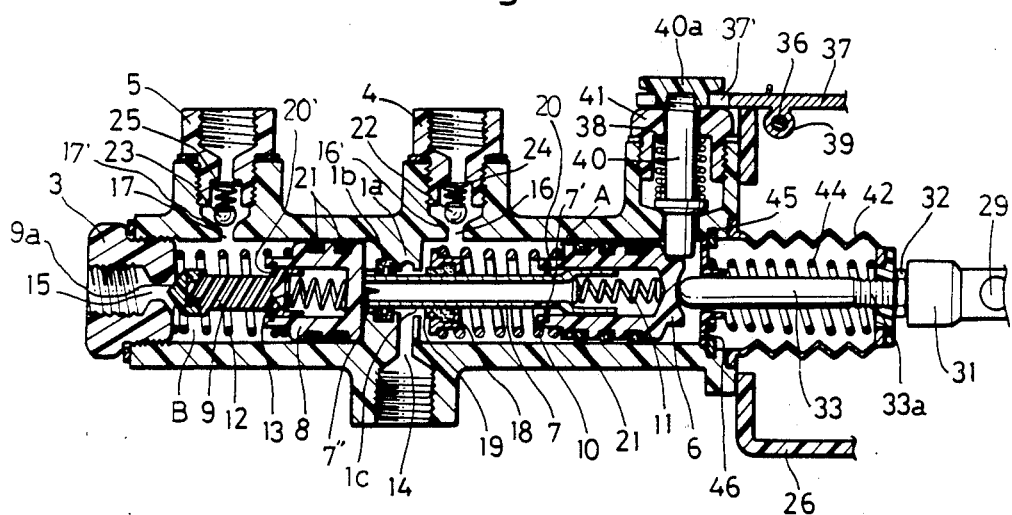
FIG. 7 is a view similar to FIG. 6 with the brake pedal depressed after the clutch pedal has been depressed.
Figure 8:
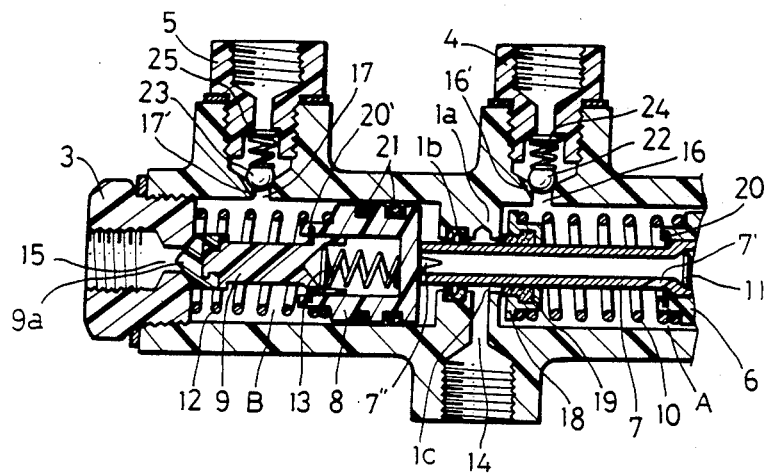
FIG. 8 is a view similar to FIG. 5 showing the moment when the brake pedal is released from the driver's foot with the clutch pedal raised a little.

FIG. 7 shows when the brake pedal E is depressed with the clutch pedal D already having been depressed. At this time the force of the fluid from the master cylinder C has forced the spring seat 18 with packing 19 and the push rod 9 with packing 9a to be respectively separated from the central wall 1a and inlet 15 for receiving fluid into the chambers A, B, thereby pushing the pistons 6, 8 rearwardly. It will be noted that further rearward movement of rear piston 6 is not allowed since the end portion of the stop pin 40 is caught on the back portion of the back piston 6. If rod 33 is also pushed rearwardly causing the clutch pedal D to be slightly moved upwardly, such movement is so small as to be insignificant so that the clutch is maintained in its position of disengagement. The fluid received at the time when the push rod 9 and sealing packing 19 are pushed rearwardly pushes the check valve balls 22, 23 off their seats so that fluid pressure is transmitted to the wheel cylinders f, f' thereby operating the brake shoes thus stopping the car.

On releasing the driver's right foot from the brake pedal E with the clutch pedal D being in a slight upward position in which position the disengagement of the clutch is maintained, the back flow of the fluid into the chambers A, B is prevented.

Figure 9:
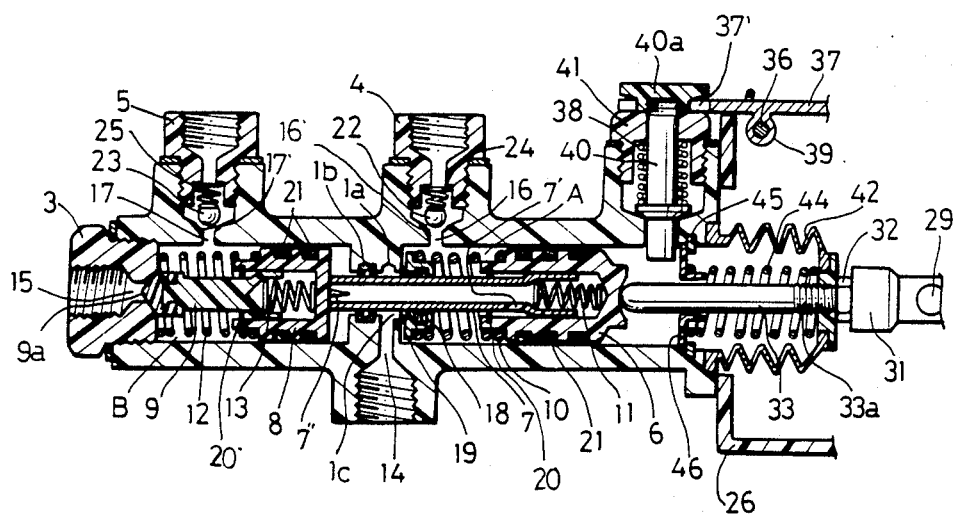
FIG. 9 is a view similar to FIG. 6 with the clutch pedal further than in FIG. 8.

At this time the check valve balls 22, 23 quickly sealingly engage the outlets 16, 17 for preventing backflow of the fluid through the outlets 16, 17, thereby even in the foot's released position from the brake pedal E the engine is in the starting position without jolting or slipping of the car. The outlets 16, 17 are formed with gaps 16', 17' at their one end. However, shifting of the fluid is prevented since the chambers A and B are tightly sealed. In this condition since the fluid does not flow backwardly from the brake lines into the chambers A, B the car maintains the stopped position. There often tends to be backward slipping of the car. In this case as shown in FIG. 9 by further depressing of the clutch pedal D the rod 33 will be pressed forwardly pushing the rear piston 6 and the front piston 8 forwardly thus pressurizing the fluid in the chambers A, B, thereby pushing the check valve balls 22, 23 open for entering fluid into the brake lines. Thus, the car never slips backwardly even when the brake pedal E is not depressed. At this time some fluid which has remained in the rear chamber A through the oil hole 7' formed in the piston rod 7, and along the inside of the piston rod, exerts force on the bottom of the front piston 8. Thereby this force aids in moving the piston 8 forwardly, and the fluid which has pressed the front piston 8 returns through the V-shaped cut out portion 7" to the oil hole 7' and passes out through the hole 7'.

When the driver desires to start his car he depresses the accelerator pedal as he gradually releases his foot from the clutch pedal D thus causing the control cylinder assembly to return to the condition shown in FIG. 4. As the inlets 14, 15 open, the fluid which has flowed out through the outlets 16, 17 flows backwardly through the small gaps 16', 17' into the chambers A, B. At the same time fluid from master cylinder C flows into the chambers A, B to maintain these chambers full during return of the pistons 7 and 8 to the position of FIG. 4. At that time the brake is released and as the foot is gradually released from the clutch pedal D the car begins to move. As the clutch pedal D is released, piston operating lever 30 is rotated upwardly (counterclockwise in FIG. 2) thus moving the rod 33 to the right. Accordingly, the end of the space control bolt 34 presses the right end portion of the rectangular movable plate 37 thus moving upwardly the left semi-oval cut-out portion of the plate 37 together with the upward movement of stop pin 40 to the position shown in FIG. 4.

Figure 10:
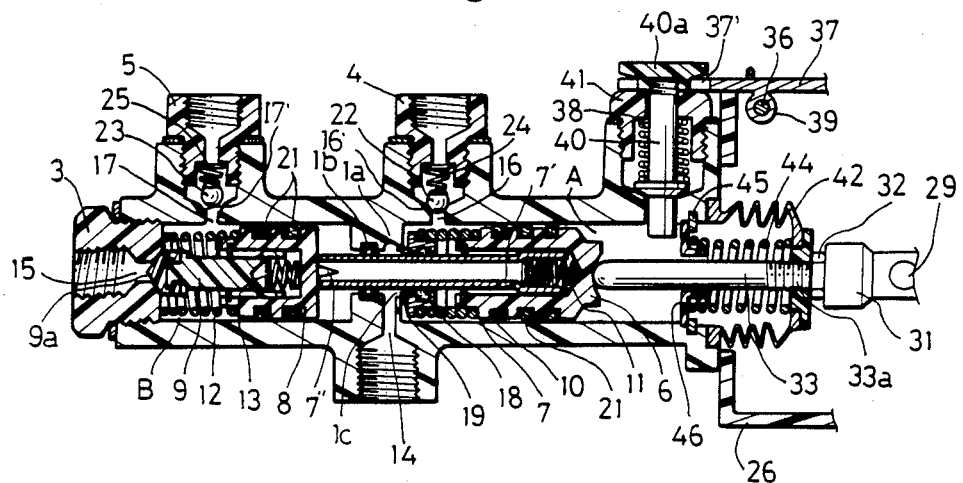
FIG. 10 view similar to FIG. 6 showing the condition where the brake line of a back wheel has burst.
Figure 11:
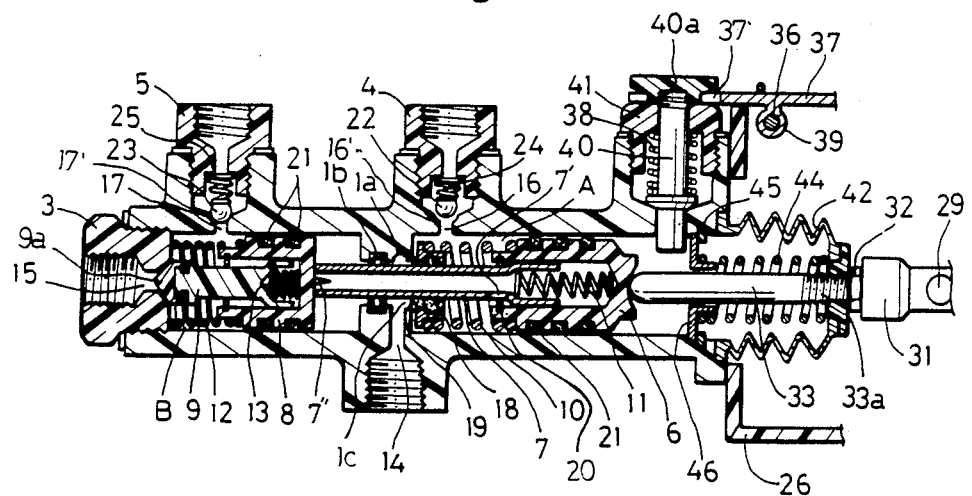
FIG. 11 is a view similar to FIG. 6 showing the condition where the brake line of a front wheel has burst.
Figure 12:
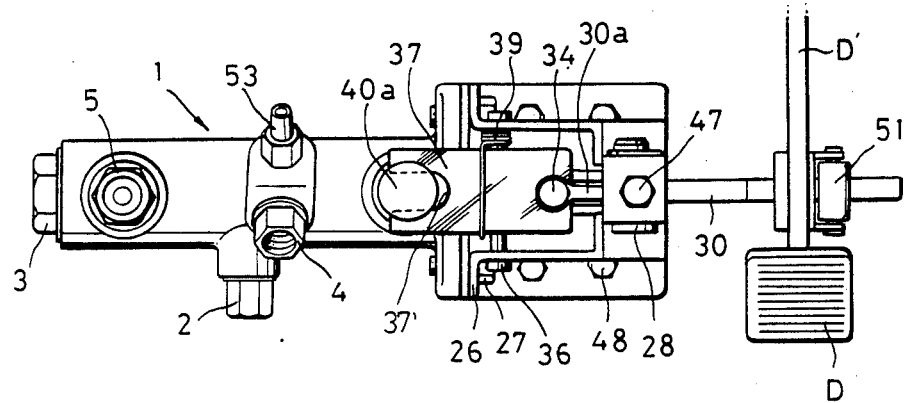
FIG. 12 a top plan view of the control cylinder assembly of FIG. 1 showing connection of the assembly to the clutch pedal.
Figure 13:
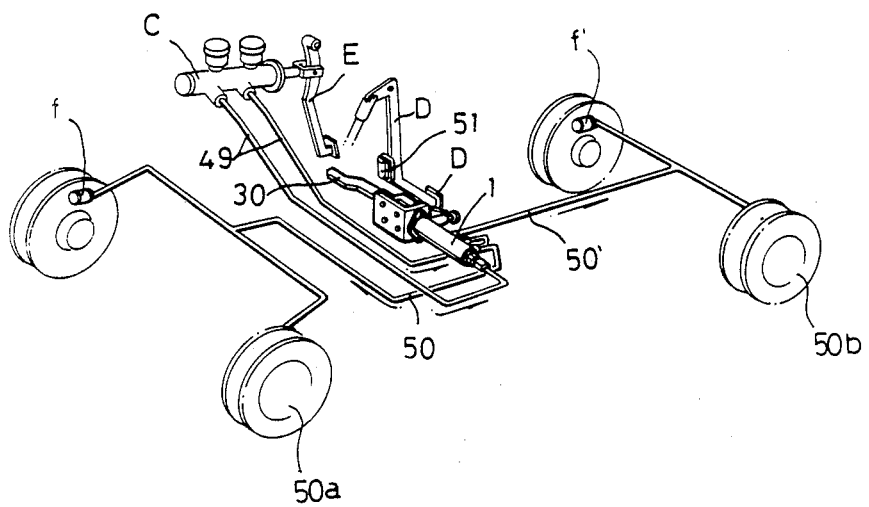
FIG. 13 is a perspective view of the control cylinder assembly of the present invention showing connection of the assembly to brake lines.

In an emergency such as where one of the brake lines bursts resulting in leakage of brake fluid in that line as shown in FIGS. 10 and 11, the fluid pressure in one of the chambers is always maintained and thereby the brake is operated without failure.

We claim:

1. A brake fluid control cylinder assembly for use in a brake system of an automobile having a clutch pedal and a brake pedal comprising:

a cylindrical housing having a first end and a second end;

first and second coaxially-spaced cylinder chambers in said housing;

an internal flange wall between said cylinder chambers;

an axial hole through said flange wall communicating between said cylinder chambers;

respective first and second cup-shaped pistons axially movable in said first and second cylinder chambers, said pistons each having a hollow central portion and a bottom;

respective first and second piston rods in said cylinder chambers each having one end thereof axially slidably mounted in said hollow central portion of respective first and second pistons, said second piston rod extending through said axial hole in said flange wall;

a first brake fluid inlet in said first end of said housing communicating with said first cylinder chamber and having a first valve seat therein;

first valve means on the other end of said first piston rod engageable with said first valve seat;

a first piston spring means in said first cylinder chamber for resiliently urging said first piston away from said first end of said housing;

a first piston rod spring means in said hollow central portion of said first piston for resiliently urging said first piston rod toward said first end of said housing and said first valve means toward sealing engagement with said first valve seat;

a first brake fluid outlet for said first cylinder chamber through said housing disposed between said first valve seat and said first piston;

a first outlet check valve means in said first outlet for providing outlet flow from said first cylinder chamber at a predetermined fluid pressure;

a second valve seat in said flange wall at said axial hole;

a second valve means sealingly and slidably mounted on said second piston rod in said second cylinder chamber engageable in sealing relationship with said second valve seat;

a second piston spring means in said second cylinder chamber having one end connected to said second piston and the other end connected to said second valve means for resiliently urging said second valve means toward engagement with said second valve seat;

a second piston rod spring means in said hollow central portion of said second piston for resiliently urging said second piston rod into engagement at the other end thereof with said first piston;

a second brake fluid inlet through said housing communicating with said axial hole in said flange wall between said second valve seat and said first cylinder chamber;

seal means between said flange and said second piston rod and between said second brake fluid inlet and said first cylinder chamber for sealing said axial hole in said flange wall between said second fluid inlet and said first cylinder chamber;

a second brake fluid outlet through said housing for said second cylinder chamber disposed between said second piston and said second valve seat;

second outlet check valve means in said second outlet for providing outlet flow from said second cylinder chamber at a predetermined fluid pressure; and clutch pedal operated means operated by depressing the clutch pedal for moving said piston rods to urge said first and second valve means into engagement with the respective valve seats, and for limiting return movement of said second piston upon release of the clutch pedal.

2. A brake fluid control cylinder assembly as claimed in claim 1 wherein said clutch pedal operated means comprises:

a piston operating lever pivotally mounted on the body of the automobile;

an operating rod means connected to said piston operating lever and engaging said second piston; and a limiting pin member slidably mounted in said housing for movement between positions of non-abutting and abutting relationship with said second piston.

3. A brake fluid control cylinder assembly as claimed in claim 2 wherein said clutch pedal operated means further comprises:

a bracket member mounted on the body of the automobile, said piston operating lever being pivotally mounted on said bracket;

resilient means urging said limiting pin into said abutting position and;

a limiting pin operating lever pivotally mounted on said bracket and engaging said limiting pin and said piston operating lever for moving said limiting pin into said non-abutting position upon release of said clutch pedal.

4. A brake fluid control cylinder assembly as claimed in claim 3 and further comprising:

an adjusting element on said piston operating lever for adjusting the engagement thereof with said limiting pin operating lever; and means for pivotally connecting said operating rod means to said piston operating lever.

5. A brake fluid control cylinder assembly as claimed in claim 1 wherein:

each check valve means comprises a spring urged ball check valve member engageable with a cooperating ball valve seat in respective first and second outlets; and fluid return means is provided at each check valve for returning brake fluid to said chamber through said brake fluid outlets when said clutch pedal and brake pedal are released.

6. A brake fluid control cylinder assembly as claimed in claim 4 wherein:

each check valve means comprises a spring urged ball check valve member engageable with a cooperating ball valve seat in respective first and second outlets; and fluid return means is provided at each check valve for returning brake fluid to said chambers through said brake fluid outlets when said clutch pedal and brake pedal are released.

7. A brake fluid control cylinder assembly as claimed in claim 5 wherein:

said fluid return means comprises at least one gap between said ball member and said ball valve seat when said check valve is closed.

8. A brake fluid control cylinder assembly as claimed in claim 6 wherein:
   said fluid return means comprises at least one gap between said ball member and said ball valve seat when said check valve is closed.

9. A brake fluid control cylinder assembly as claimed in claim 1 wherein:
   said second piston rod spring means has a higher resilient force than said second spring means, said second piston spring means has a higher resilient force than said first piston spring means, and said first piston spring means has a higher resilient force than said first piston rod spring means.

10. A brake fluid control cylinder assembly as claimed in claim 1 wherein:
   a small space is provided between said second valve seat and said second valve means when the clutch is in the released position.

* * * * *